US009202285B2

(12) United States Patent
Kimura

(10) Patent No.: US 9,202,285 B2
(45) Date of Patent: Dec. 1, 2015

(54) IMAGE PROCESSING APPARATUS, METHOD, AND PROGRAM

(75) Inventor: Jun Kimura, Kanagawa (JP)

(73) Assignee: SONY CORPORATION, Tokyo (JP)

(\*) Notice: Subject to any disclaimer, the term of this patent is extended or adjusted under 35 U.S.C. 154(b) by 512 days.

(21) Appl. No.: 13/636,426

(22) PCT Filed: Mar. 15, 2011

(86) PCT No.: PCT/JP2011/056105
§ 371 (c)(1),
(2), (4) Date: Sep. 21, 2012

(87) PCT Pub. No.: WO2011/122333
PCT Pub. Date: Oct. 6, 2011

(65) Prior Publication Data
US 2013/0011049 A1    Jan. 10, 2013

(30) Foreign Application Priority Data

Mar. 29, 2010  (JP) ............................... P2010-076302

(51) Int. Cl.
*G06K 9/62*     (2006.01)
*G06T 7/20*     (2006.01)

(52) U.S. Cl.
CPC ..... *G06T 7/2053* (2013.01); *G06T 2207/10016* (2013.01); *G06T 2207/20081* (2013.01); *G06T 2207/20144* (2013.01); *G06T 2207/30196* (2013.01); *G06T 2207/30201* (2013.01)

(58) Field of Classification Search
CPC ................. G06T 7/2053; G06T 2207/30201; G06T 2207/10016; G06T 2207/20081; G06T 2207/30196; G06T 2207/20144; G06T 7/004

USPC .......................................... 382/155, 173, 190
See application file for complete search history.

(56) References Cited

U.S. PATENT DOCUMENTS 5,528,703 A  *  6/1996  Lee ............................... 382/257
2006/0262958 A1 * 11/2006  Yin et al. ....................... 382/103
(Continued)

FOREIGN PATENT DOCUMENTS

JP       2001-118182       4/2001

OTHER PUBLICATIONS

Shimada, A. et al., "Increment and Decrement of Gaussians in Adaptive Mixture-of-Gaussian Background Models," MIRU 2006, pp. 746-751, (2006).

(Continued)

*Primary Examiner* — Samir Ahmed
(74) *Attorney, Agent, or Firm* — Hazuki International, LLC

(57) ABSTRACT

The present invention relates to an image processing apparatus, method, and program that can extract an object from an input image more easily and more accurately.
A face detecting unit (31) detects a face from an input image, a mask area setting unit (33) sets a mask area which masks a person in the input image based on a position of the face detected by the face detecting unit (31), a background model updating unit (51) updates a background image by learning areas other than the mask area in the input image as the background image, and a separating unit (54) separates the input image into the background image and a foreground image which is an area of the person in the input image based on the background image updated by the background model updating unit (51) and the input image. The present invention can be applied to, for example, an image processing apparatus that extracts a person from an input image.

12 Claims, 13 Drawing Sheets

(56) References Cited

U.S. PATENT DOCUMENTS

| | | | |
|---|---|---|---|
| 2007/0273765 A1* | 11/2007 | Wang et al. | 348/152 |
| 2009/0041297 A1* | 2/2009 | Zhang et al. | 382/103 |
| 2010/0014781 A1* | 1/2010 | Liu et al. | 382/285 |
| 2011/0142289 A1* | 6/2011 | Barenbrug et al. | 382/107 |
| 2012/0008858 A1* | 1/2012 | Sedky et al. | 382/155 |

OTHER PUBLICATIONS

Ukita, N.et al., "Color Target Learning and Real-Time Object Detection for Non-Stationary Scenes by Background Subtraction with Color Detection," MIRU 2004, pp. 11-24 to II-29, (2004).

* cited by examiner

IMAGE PROCESSING APPARATUS, METHOD, AND PROGRAM

TECHNICAL FIELD

The present invention relates an image processing apparatus, method, and program, and more particularly to an image processing apparatus, method, and program which can extract an object from an input image more simply and more accurately.

BACKGROUND ART

Conventionally, there is a technology which extracts an object by using background difference.

In the background difference, a difference between a background image prepared beforehand and an observation image (input image) including an object to be extracted is calculated so that an object area can be extracted as a foreground image without needing prior knowledge concerning the object.

However, with a simple calculation of the difference between the static background image and the input image, noise, such as changes in brightness due to changes in weather or indoor lighting, and slight movements of trees or objects other than extraction targets which are included in the background of the input image might be extracted as the foreground image.

Therefore, to flexibly respond to the changes in the background, various background modeling techniques such as a background model estimation technique which uses mixture Gaussian distribution (GMM (Gaussian Mixture Model)) are proposed (for example, see non-patent documents 1 and 2). According to the background model estimation technique using the mixture Gaussian distribution, a robust response to temporary variations in background and rapid variations in background is possible.

CITATION LIST

Non-Patent Document

Non-Patent Document 1: Atsushi Shimada, Daisaku Arita, and Rin-ichiro Taniguchi, "Distribution number increase and decrease method of dynamic background model based on mixture Gaussian distribution," Proc. Meeting on Image Recognition and Understanding (MIRU 2006), July 2006.

Non-Patent Document 2: Norimichi Ukita and Takekazu Kato, "Automated learning of target color based on integration of background difference and color detection, and Real-time target detection robust to changes in background," Proc. Meeting on Image Recognition and Understanding (MIRU2004), Vol. 2 pp. 24-29, 2004

SUMMARY OF THE INVENTION

Problems to be Solved by the Invention

However, in the above-described techniques, a process of preliminarily learning a background image is necessary and information to become the foreground image needs to be prevented from being included in the background image available at that time. Moreover, this setting is troublesome for the user. Moreover, when the above-described techniques are applied to a complex background image, it was difficult to achieve a real-time operation and set a background model.

In the above-described techniques, whether to keep extracting the object which has been extracted as the foreground image or not to extract it any more by treating it as the background image depends on the usage of the object extraction. Moreover, no background modeling techniques which can flexibly respond to this have been proposed yet.

The present invention has been made in view of the foregoing problems and is intended to make it possible to extract an object from an input image more easily and accurately.

Solutions to Problems

An image processing apparatus according to a first aspect of the present invention includes: a detecting means that detects a dynamic body from an input image; a setting means that sets a mask area to mask the dynamic body in the input image, based on a position of the dynamic body detected by the detecting means; an updating means that updates a background image by learning areas other than the mask area in the input image as the background image; and a separating means that separates the input image into the background image, and a foreground image that is an area of the dynamic body in the input image, based on the background image updated by the updating means and the input image.

The detecting means can detect the dynamic body for each frame of the input image, the setting means can set the mask area when the change in the position of the dynamic body between frames is larger than a given threshold, and the updating means can learn areas other than the mask area which is set when the change in the position of the dynamic body between frames is larger than the given threshold as the background image. In this way, the background image can be updated.

The setting means can set an initial mask area which masks the dynamic body detected in a given frame of the input image, and the updating means can learn areas other than the mask area which is set when the change in the position of the dynamic body between frames, which are subsequent to the given frame, is larger than a given threshold until all correspondence areas corresponding to the initial mask area within the input image are learned as the background image.

The information processing apparatus is further provided with a storage means to store the background image updated by the updating means, and the updating means may can update the background image based on the input image and the background image stored in the storage means when a change in the position of the dynamic body between frames is smaller than a given threshold.

The updating means can update the background image based on the input image and the background image stored in the storage means for every predetermined number of frames when all of the correspondence areas are learned as the background image.

An image processing method according to a second aspect of the present invention includes: a detection step of detecting a dynamic body from an input image; a setting step of setting a mask area that masks the dynamic body in the input image based on a position of the dynamic body detected by the detection step; an updating step of updating a background image by learning areas other than the mask area in the input image as the background image; and a separation step of separating the input image into the background image, and a foreground image that is an area of the dynamic body in the input image, based on the background image updated by the updating step and the input image.

A program of one aspect of the present invention causes a computer to execute processing including a detection step of detecting a dynamic body from an input image, a setting step of setting a mask area which masks the dynamic body in the input image based on a position of the dynamic body detected by the detection step, an update step of updating a background image by learning areas other than the mask area within the input image as the background image, and a separation step of separating the input image into the background image and an foreground image, which is an area of the dynamic body within the input image, based on the background image which has been updated by the update step, and the input image.

In one aspect of the present invention, a dynamic body is detected from an input image, a mask area which masks the dynamic body in the input image is set based on a position of the detected dynamic body, and an area other than the mask area within the input image is learned as a background image. In this way, the background image is updated, and the input image is separated into the background image and a foreground image which is an area of the dynamic body within the input image based on the input image and the updated background image.

Effects of the Invention

According to one aspect of the present invention, it becomes possible to extract an object from an input image more easily and more accurately.

MODE FOR CARRYING OUT THE INVENTION

Figure 1:
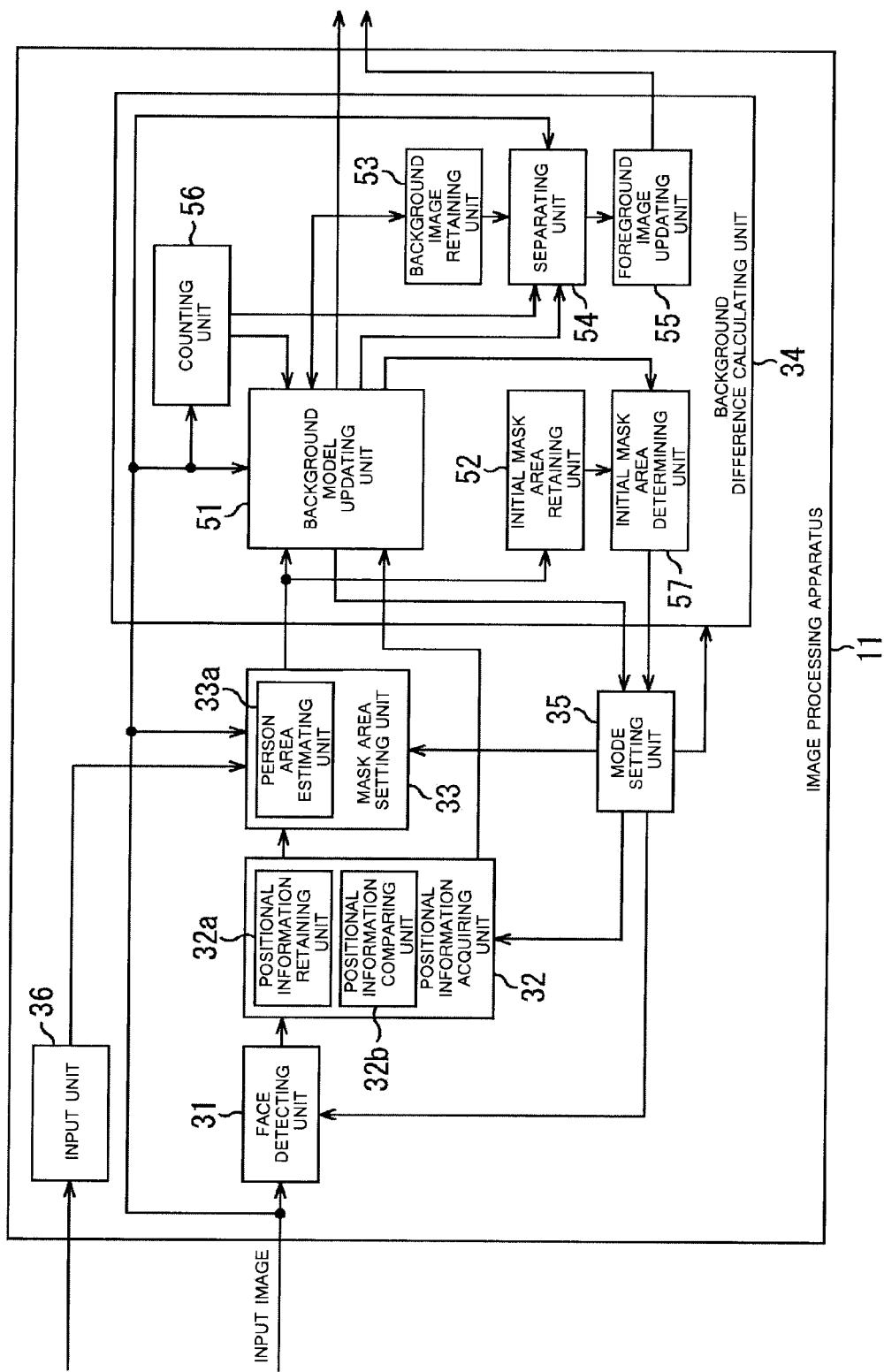
FIG. 1 is a block diagram that illustrates an example of a functional configuration of one embodiment of an image processing apparatus to which the present invention is applied.

Hereafter, embodiments of the present invention are described referring to the drawings. The description is made in the following order.
1. First Embodiment (Example of Person Extraction)
2. Second Embodiment (Another Example of Person Extraction)
3. Third Embodiment (Example of Object Extraction)

1. First Embodiment

[Regarding Example of Functional Configuration of Image Processing Apparatus]

FIG. 1 illustrates an example of a functional configuration of one embodiment of an image processing apparatus to which the present invention is applied.

An image processing apparatus 11 of FIG. 1 learns areas other than an area of a dynamic body (person) to be observed as a background image for each frame and repeatedly distinguishes between a foreground image which is an area of the person and the background image, that is, executes so-called background difference-based person extraction processing.

The image processing apparatus 11 includes a face detecting unit 31, a positional information acquiring unit 32, a mask area setting unit 33, a background difference calculating unit 34, a mode setting unit 35, and an input unit 36.

A moving image which is an input image input to the image processing apparatus 11 is supplied to the face detecting unit 31, the mask area setting unit 33, and the background difference calculating unit 34 frame by frame.

The face detecting unit 31 detects a face from the input image, and supplies area information that represents the area of the detected face (face area) to the positional information acquiring unit 32.

The positional information acquiring unit 32 acquires (or calculates) positional information that indicates the position of the face which has been detected by the face detecting unit 31 based on the area information supplied from the face detecting unit 31. The positional information acquiring unit 32 supplies the calculated positional information to the mask area setting unit 33 as necessary.

Moreover, the positional information acquiring unit 32 includes a positional information retaining unit 32a and a positional information comparing unit 32b. The positional information retaining unit 32a stores (or retains) the acquired positional information on a frame basis. The positional information comparing unit 32b compares positional information of an immediately previous frame retained in the positional information retaining unit 32a with newly acquired (or calculated) positional information. The calculated positional information is supplied to the mask area setting unit 33 or the result of the comparison is supplied to the background difference calculating unit 34, depending on the result of the comparison performed by the positional information comparing unit 32b.

The mask area setting unit 33 sets a mask area which masks a person in the input image, based on the positional information supplied from the positional information acquiring unit 32, and supplies information which represents the mask area to the background difference calculating unit 34. Specifically, the mask area setting unit 33 includes a person area estimating unit 33a. The person area estimating unit 33a estimates a person area which is an area of a person in the input image, from the position of the face indicated by the positional information supplied from the positional information acquiring unit 32. The mask area setting unit 33 sets the person area estimated by the person area estimating unit 33a as the mask area.

The background difference calculating unit 34 distinguishes between a foreground image and a background image in the input image which is input on a frame basis by using background difference, and outputs the result to an external display or the like not illustrated in the drawings.

The background difference calculating unit 34 includes a background model updating unit 51, an initial mask area retaining unit 52, a background image retaining unit 53, a separating unit 54, a foreground image updating unit 55, a counting unit 56, and an initial mask area determining unit 57.

The background model updating unit 51 learns areas other than the mask area in the input image as the background image based on information that represents the mask area supplied from the mask area setting unit 33, and updates the background image retained in the background image retaining unit 53. The updated background image is suitably output to the external display or the like which is not illustrated in the drawings.

The initial mask area retaining unit 52 stores (retains) information that represents a mask area (initial mask area) which is initially set by the mask area setting unit 33, for example, after the image processing apparatus 11 begins person extraction processing using the background difference. The retained information is read out into an initial mask area determining unit 57 as necessary.

The background image retaining unit 53 stores (or retains) the background image updated through the learning operation by the background model updating unit 51. The retained background image is read out into the background model updating unit 51 or to the separating unit 54 as necessary.

The separating unit 54 separates the input image, which is input on a frame basis, into the foreground image that is an image other than the background image and the background image that is read out from the background image retaining unit 53, based on the information supplied from background model updating unit 51 or the counting unit 56, and supplies the foreground image to the foreground image updating unit 55.

The foreground image updating unit 55 stores (retains) the foreground image supplied from the separating unit 54 on a frame basis, updates the foreground image whenever it is supplied from the separating unit 54, and outputs it to the external display or the like.

The counting unit 56 counts the number of frames of the input image which is input, and supplies an instruction according to the count value to the background model updating unit 51 or to the separating unit 54.

The initial mask area determining unit 57 determines whether there is a remaining initial mask area in the background image updated by the background model updating unit 51, based on information that represents an initial mask area retained in the initial mask area retaining unit 52.

The mode setting unit 35 sets an operation mode of the image processing apparatus 11 based on information on the operation mode supplied from the background difference calculating unit 34, and supplies information that represents the set operation mode to all the units which constitute the image processing apparatus 11. The operation modes of the image processing apparatus 11 will be described later referring to FIG. 2.

The input unit 36 is operated by the user so that instructions with respect to the image processing apparatus 11 can be input. The input unit 36 includes, for example, various operation buttons, keys, and touch panels. The input unit 36 receives the operation from the user, and supplies information that represents the operation contents to the mask area setting unit 33.

[Regarding Operation Mode of Image Processing Apparatus]

Figure 2:
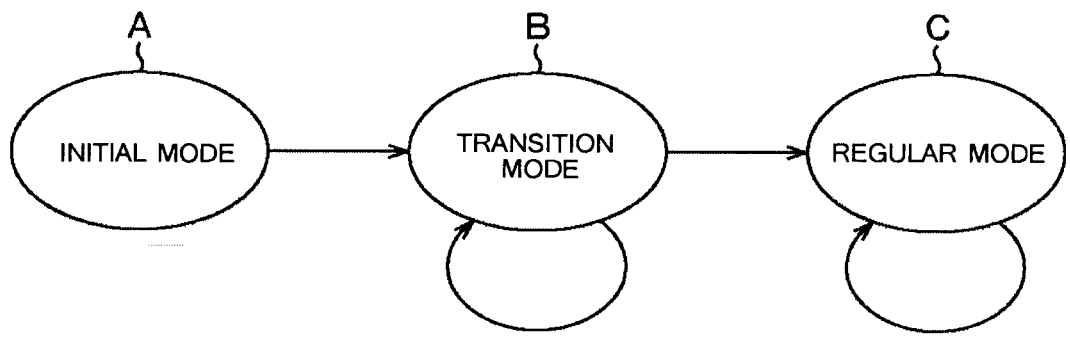
FIG. 2 is a mode shift diagram that illustrates an example of operation modes of the image processing apparatus.

Next, mode shifting between operation modes of the image processing apparatus 11 is described referring to a mode shift diagram of FIG. 2.

In the mode shift diagram of FIG. 2, each operation mode is indicated by one oval. That is, three operation modes including mode A, mode B, and mode C are illustrated in the mode shift diagram of FIG. 2.

The mode A is an initial mode among the operation modes of the image processing apparatus 11, that is, a mode to perform initial processing on the first frame within extraction processing of extracting a person from the input image. The operation mode shifts from the mode A to the mode B when the image processing apparatus 11 finishes the initial processing.

The mode B is a transition mode among the operation modes of the image processing apparatus 11, that is, a mode to perform transition processing within the extraction processing of extracting a person from the input image. That is, in this mode, the background image is learned from the input image on a frame basis, and the background image is repeatedly updated. As for the image processing apparatus 11, it is not necessary to preliminarily learn the background image because of this transition processing. The operation mode shifts from the mode B to the mode C when the image processing apparatus 11 finishes learning the background image up to a given stage.

The mode C is a regular mode among the operations of the image processing apparatus 11, and is a mode to perform the same regular processing as a conventional background modeling (updating) technique within the extraction processing of extracting a person from the input image. However, in the regular processing of the image processing apparatus 11, the background is modeled for every given number of frames.

Next, processing in each operation mode of the image processing apparatus 11 which has been described in FIG. 2 is described in more detail.

[Regarding Initial Processing of Image Processing Apparatus]

Figure 3:
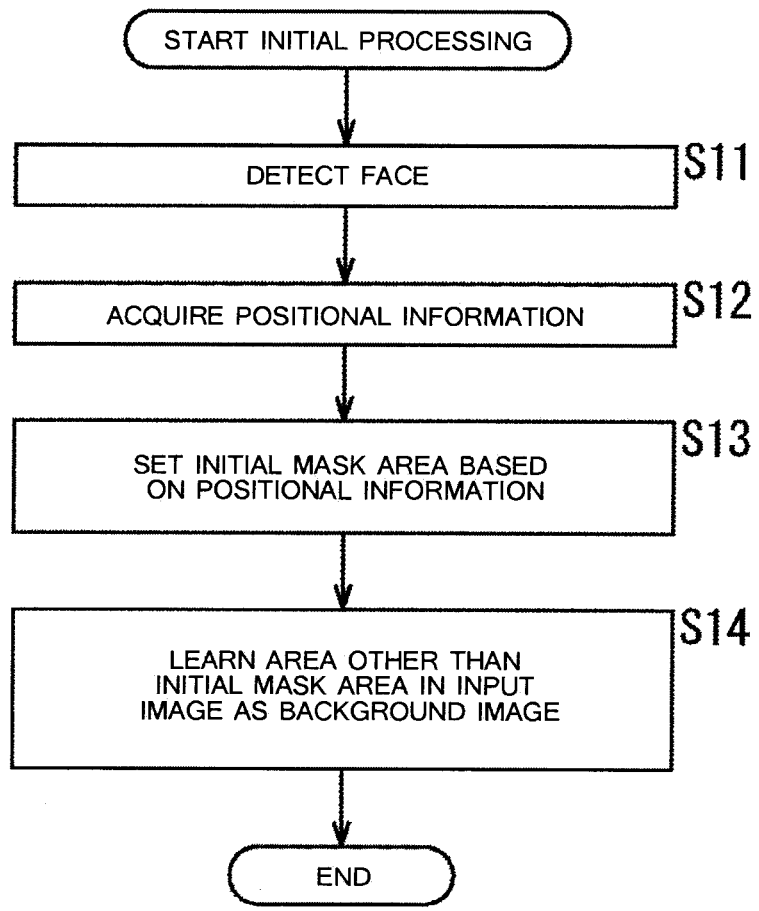
FIG. 3 is a flowchart that describes initial processing in an initial mode.

First, the initial processing performed in the initial mode of the image processing apparatus 11 is described referring to a flowchart of FIG. 3. The image processing apparatus 11 begins the initial processing when the apparatus enters the initial mode, for example, after a power supply is turned on, after input of a moving image is completed, or the like, and then a given moving image is input as an input image in such a state.

In step S11, the face detecting unit 31 detects a person's face from the first frame of the input image. For example, the face detecting unit 31 detects a person's face from the input image by learning facial images of faces viewed from various directions, and supplies area information that represents a face area detected as a rectangular area to the positional information acquiring unit 32. Here, the area information is assumed to be coordinates, etc. of an upper-left vertex and a lower-right vertex of the rectangle region that is the face area for example.

In step S12, the positional information acquiring unit 32 acquires (calculates) positional information that indicates the position of the face detected by the face detecting unit 31, based on the area information supplied from the face detecting unit 31, and supplies it to the mask area setting unit 33.

Moreover, the positional information acquiring unit 32 stores the acquired positional information of the face for the first frame in the positional information retaining unit 32a. Here, the positional information is assumed to be information, etc. that includes the area information supplied from the positional information acquiring unit 32 and coordinates of the center of gravity of the rectangular area represented by the area information. The positional information is satisfactory if it can specify the position of the face area in the input image for each frame of the input image, and may be, for example, the area information supplied from the positional information acquiring unit 32.

In step S13, the mask area setting unit 33 sets an initial mask area that masks a person in the first frame of the input image, based on the positional information supplied from the positional information acquiring unit 32 and supplies information that represents the initial mask area to the background difference calculating unit 34.

Figure 4:
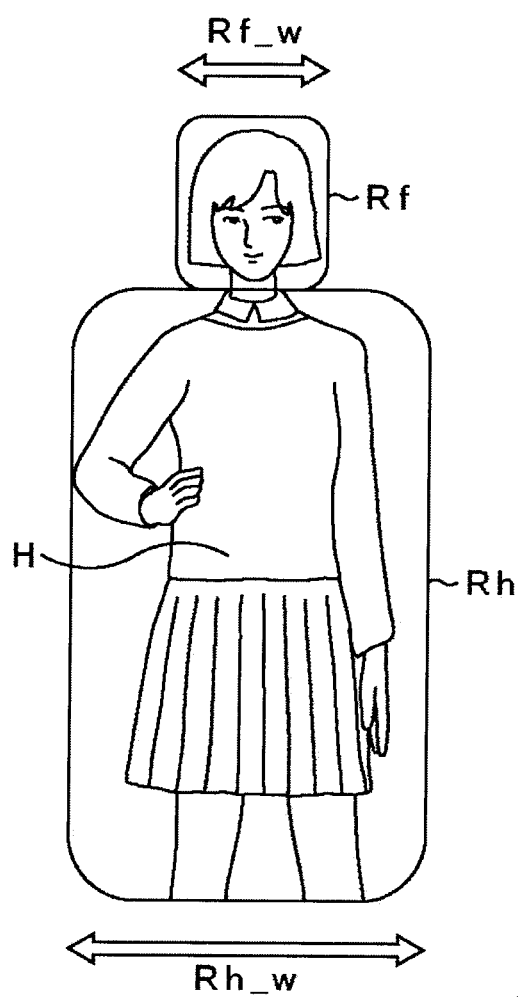
FIG. 4 is a diagram that describes settings of a person area.

Specifically, the person area estimating unit 33a of the mask area setting unit 33 estimates an upper-body area Rh of a person H in the input image, based on a face area Rf which is obtained for the face of a person H in the input image illustrated in FIG. 4.

Here, as illustrated in FIG. 4, when the width of the face area Rf is assumed to be Rf_w, the person area estimating unit 33a estimates the upper-body area Rh having the width Rh_w calculated by the following Expressions (1).

$$Rh\_w = Rf\_w \times N \qquad (1)$$

In Expression (1), a value N is a value which represents a ratio of the width of an ordinary person's face and the breadth of the ordinary person's shoulders, and it is a predetermined value, for example, 2.5 or the like.

Figure 5:
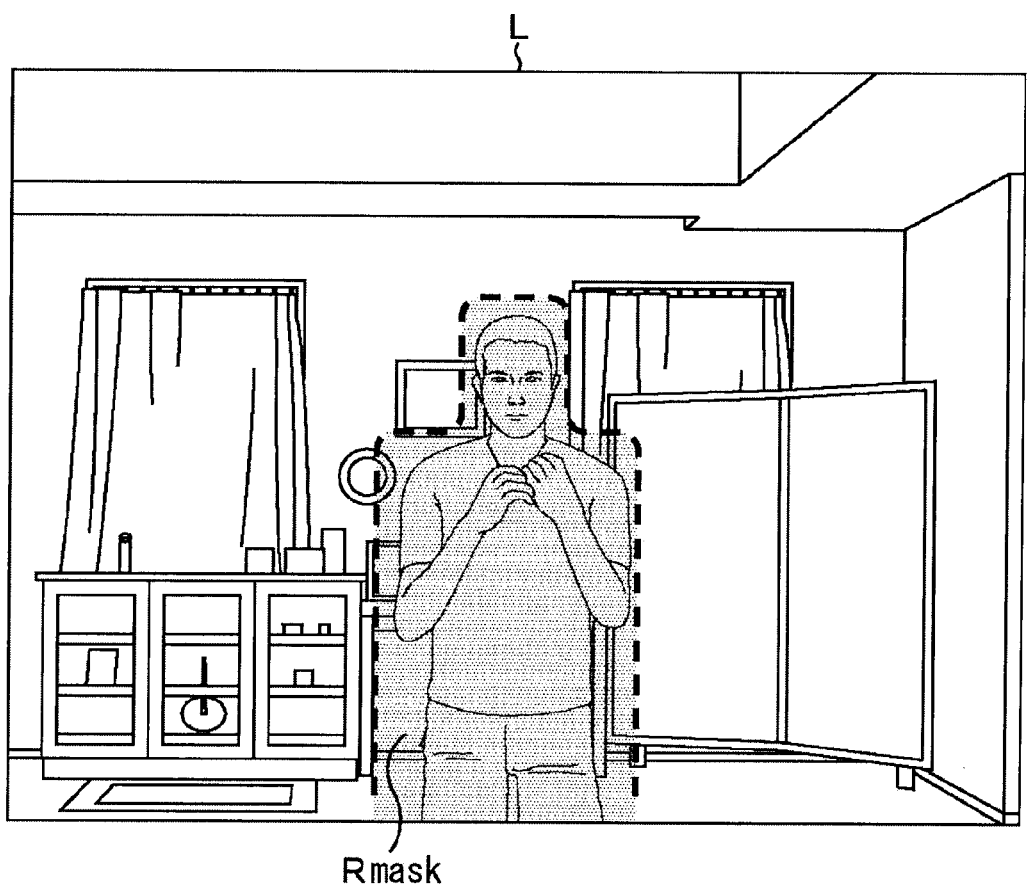
FIG. 5 is a diagram that describes settings of an initial mask area.

FIG. 5 illustrates an example of the initial mask area which is set for the input image.

As illustrated in FIG. 5, the mask area setting unit 33 sets the face area Rf and the upper-body area Rh as the person area, and it sets, as an initial mask area Rmask, an area (hatched area) inside a broken line surrounding a person who is located almost at the center of an indoor background in the first frame of the input image L.

In this way, the mask area setting unit 33 sets the person area estimated by the person area estimating unit 33a as the initial mask area, and supplies information that represents the initial mask area to the background model updating unit 51 and to the initial mask area retaining unit 52 of the background difference calculating unit 34.

In step S14, the background model updating unit 51 learns areas other than the initial mask area in the first frame of the input image as the background image, based on the information that represents the initial mask area supplied from the mask area setting unit 33, and causes the background image retaining unit 53 to retain it. At this time, the background model updating unit 51 supplies information on the effect that the initial processing in the initial mode has ended to the mode setting unit 35.

The mode setting unit 35 sets the operation mode of the image processing apparatus 11 to the transition mode, based on information on the effect that the initial processing in the initial mode has ended, which is supplied from the background model updating unit 51, and supplies information that represents the transition mode to all the units which constitute the image processing apparatus 11.

As a result, the image processing apparatus 11 becomes to operate in the transition mode.

[Regarding Transition Processing of Image Processing Apparatus]

Figure 6:
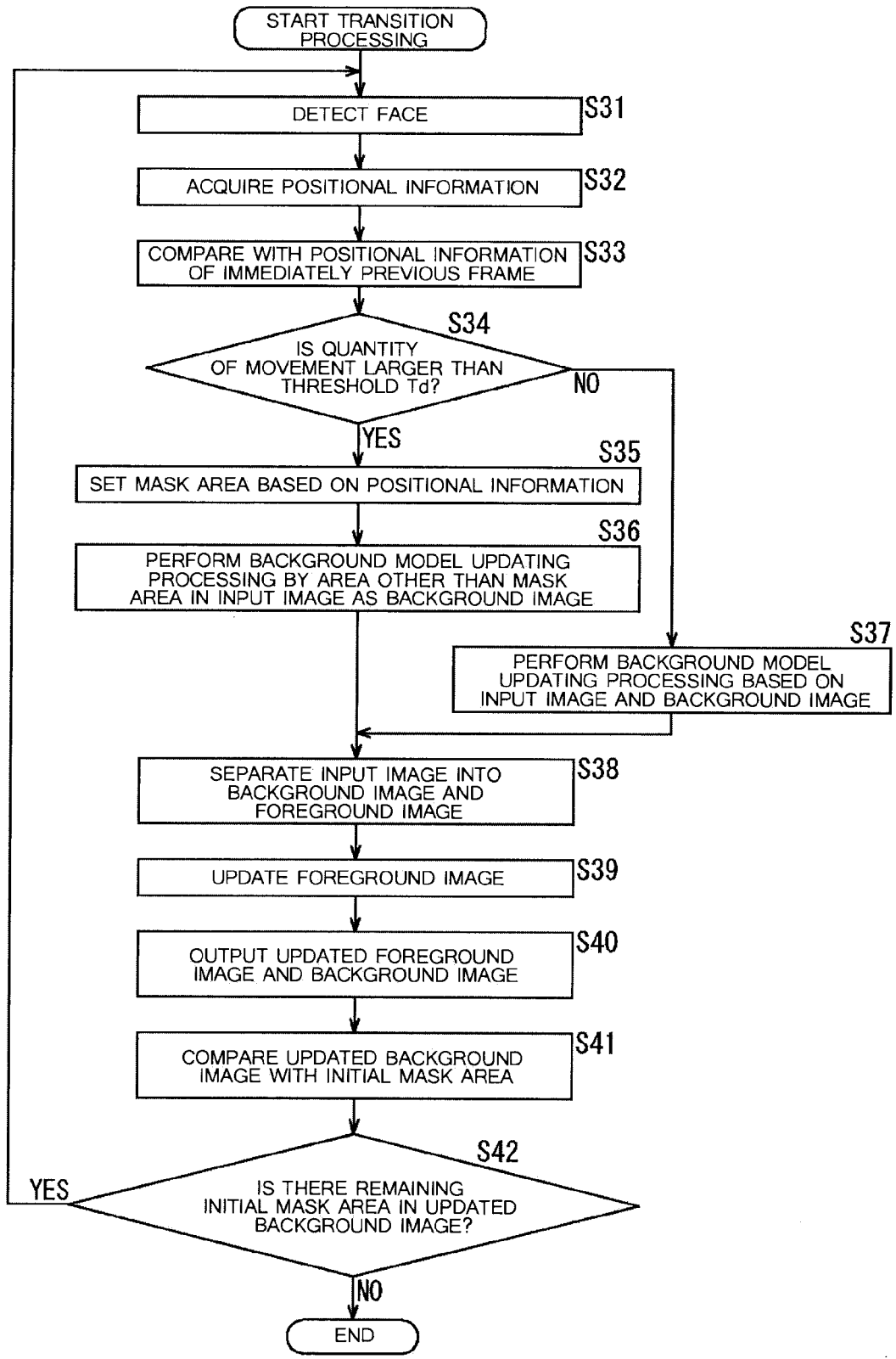
FIG. 6 is a flowchart that describes transition processing in a transition mode.

Continuously, transition processing performed in the transition mode of the image processing apparatus 11 is described referring to a flowchart of FIG. 6.

In step S31, in a similar manner to the processing of step S11 of FIG. 3, the face detecting unit 31 detects a person's face from the second frame of the input image which is input, and supplies area information that represents a face area detected as a rectangular area to the positional information acquiring unit 32.

In step S32, in a similar manner to the processing of step S12 of FIG. 3, the positional information acquiring unit 32 acquires (calculates) the positional information that indicates the position of the face detected by the face detecting unit 31 based on the area information supplied from the face detecting unit 31, and supplies it to the mask area setting unit 33. Then the positional information acquiring unit 32 stores the calculated positional information of the face in the second frame in the positional information retaining unit 32a.

In step S33, the positional information comparing unit 32b of the positional information acquiring unit 32 compares the positional information of an immediately previous frame stored in the positional information retaining unit 32a and the positional information newly acquired in step S32 with each other. Specifically, for example, the positional information comparing unit 32b obtains a change in the position of the face between frames by comparing the coordinates of the center of gravity of the face area included in the positional information of the first frame with the center of gravity of the face area included in the positional information of the second frame.

In step S34, the positional information comparing unit 32b determines whether the change in the position of the face between the frames which has been calculated in step S32, i.e., the quantity of movement of the face between the first frame and the second frame, is larger than a given threshold Td decided beforehand by, for example, the user.

In step S34, when it is determined that the quantity of movement of the face is larger than the given threshold Td, the positional information acquiring unit 32 supplies the positional information of the second frame acquired in step S32 to the mask area setting unit 33, and the processing proceeds to step S35.

In step S35, in a similar manner to the processing of step S13 of FIG. 3, the mask area setting unit 33 sets a mask area for the second frame of the input image based on the positional information supplied from the positional information acquiring unit 32, and supplies information that represents the mask area to the background difference calculating unit 34.

In step S36, the background model updating unit 51 learns areas other than the mask area in the second frame of the input image as the background image, based on information that represents the mask area supplied from the mask area setting unit 33, and updates the background image of the first frame retained in the background image retaining unit 53 by performing background model updating processing using, for example, GMM (Gaussian Mixture Model). The background model updating unit 51 supplies information on the effect that the background image has been updated to the separating unit 54.

Although the background model updating unit 51 is configured to perform the updating processing by using GMM, other different background model updating processing also may be used.

In the background image of the first frame retained in the background image retaining unit 53, an area corresponding to the initial mask area, that is, information of a portion where a person existed does not exist in the first frame information.

Accordingly, when the person (face) moves greatly between the first frame and the second frame, a mask area different from the initial mask area is set, and the background image of the second frame is obtained based on the newly set mask area in the second frame. By comparing the background image (initial mask area) for the first frame and the background image (mask area) for the second frame, information on the area that did not exist in the first frame may be obtained according to the quantity of movement of the person.

That is, according to the processing of step S36, information on the area (portion) that does not exist in the background image of the previous frame can be obtained.

On the other hand, when it is determined that the quantity of movement of the face is not larger than the given threshold Td in step S34, the positional information acquiring unit 32 supplies information on the effect that the quantity of movement of the face is not larger than the given threshold Td to the background model updating unit 51 and the processing proceeds to step S37.

In step S37, the background model updating unit 51 updates the background image of the first frame retained in the background image retaining unit 53 by performing, for example, the background model updating processing using GMM, based on the information supplied from the positional information acquiring unit 32, and based on the second frame of the input image, and the background image of the first frame stored in the background image retaining unit 53. The background model updating unit 51 supplies information on the effect that the background image has been updated, to the separating unit 54.

In step S38 following step S36 or step S37, the separating unit 54 separates the input image of the second frame into a background image for the second frame read out from the background image retaining unit 53 and a foreground image, based on the information supplied from the background model updating unit 51, and supplies the separated foreground image to the foreground image updating unit 55.

In step S39, the foreground image updating unit 55 stores (retains) the foreground image supplied from the separating unit 54 on a frame basis, and updates the foreground image whenever the foreground image is supplied from the separating unit 54. When the foreground image of the second frame is supplied from the separating unit 54, the foreground image updating unit 55 does not perform any process because the foreground image of the first frame is not stored.

In step S40, the foreground image updating unit 55 outputs the updated foreground image to the external display or the like which is not illustrated in the drawing. Moreover, the background model updating unit 51 outputs the background image updated in step S36 or step S37 to the external display or the like which is not illustrated in the drawing, at the same timing.

In step S41, the initial mask area determining unit 57 compares the background image and the initial mask area updated by the background model updating unit 51, based on information that represents the initial mask area retained in the initial mask area retaining unit 52, and determines whether there is a remaining initial mask area in the updated background image. That is, the initial mask area determining unit 57 determines whether all the areas corresponding to the initial mask area are learned as the background image by the processing of step S36 by obtaining information of the area which did not exist in the background image of the previous frame.

In step S42, as a result of the determination in step S41, when it is determined that there is a remaining initial mask area in the background image updated by the background model updating unit 51, that is, when all the areas corresponding to the initial mask area are not learned as the background image, the processing returns to step S31 and the processing of from step S31 to step S42 is repeatedly performed for a third frame, a fourth frame, and so on.

On the other hand, in step S42, as a result of the determination in step S41, when it is determined that there is no remaining initial mask area in the background image updated by the background model updating unit 51, that is, when all the areas corresponding to the initial mask area are learned as the background image, the initial mask area determining unit 57 supplies information on the effect that the transition processing in the transition mode has ended to the mode setting unit 35.

The mode setting unit 35 sets the operation mode of the image processing apparatus 11 to the stationary mode based on the information on the effect that the transition processing in the transition mode has ended, which is supplied from the background model updating unit 51, and supplies information that represents the stationary mode to the all the units that constitute the image processing apparatus 11.

As a result, the image processing apparatus 11 becomes to operate in the stationary mode.

According to the above-mentioned processing, the background model updating processing is performed after the background image is learned when a change in the position of a person in the input image is large, but the background model updating processing can be performed based on the background image available at that time when the change in the position of the person is not large. As a result, since the background image can be learned from the input image, preliminary background image learning is not necessary. Therefore, a person can be extracted more simply from the input image. Moreover, since the background model updating processing is performed by using the background image in which the person area after movement of the person is secured even when the quantity of movement of the person area serving as the foreground image is large, it becomes possible to flexibly respond to the background change, and extract a person from the input image more accurately.

[Regarding Regular Processing of Image Processing Apparatus]

Figure 7:
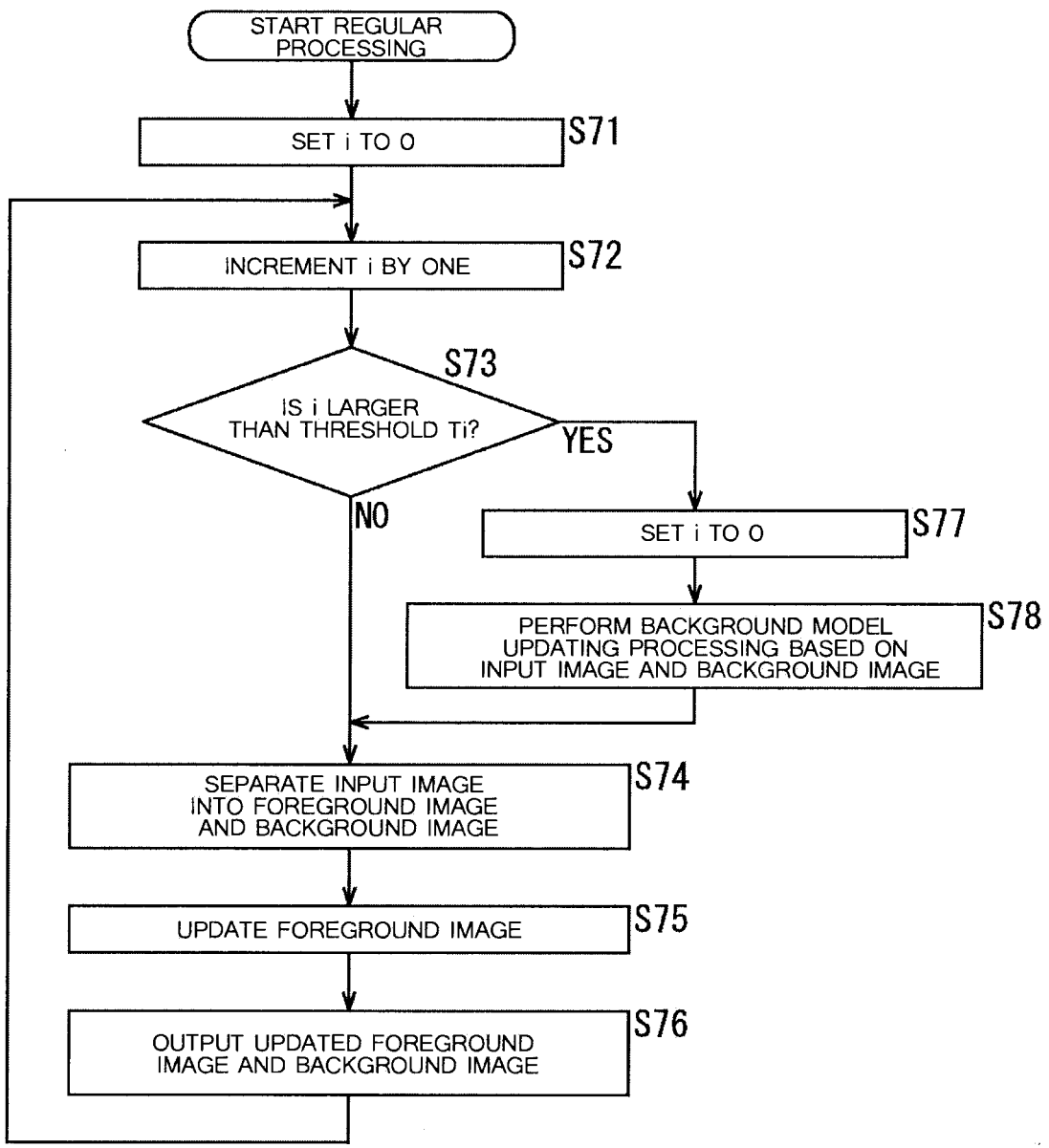
FIG. 7 is a flowchart that describes regular processing in a stationary mode.

Next, the regular processing in the stationary mode of the image processing apparatus 11 is described referring to FIG. 7. In the regular processing, the input image is supplied only to the background difference calculating unit 34.

In step S71, the counting unit 56 of the background difference calculating unit 34 initializes a count value i retained in the inside thereof to zero (0) when the information that indicates the stationary mode is supplied from the mode setting unit 35 to the background difference calculating unit 34.

In step S72, the counting unit 56 increments the count value i by one whenever one frame of the input image is input.

In step S73, the counting unit 56 determines whether the count value i is larger than a given threshold Ti which is, for example, set by the user in advance.

When it is determined that the count value i is not larger than the given threshold Ti in step S73, the counting unit 56 supplies information on the effect that the count value does not exceed the given threshold Ti to the separating unit 54, and the processing proceeds to step S74.

In step S74, the separating unit 54 separates the input image into a background image which is read from the background image retaining unit 53 and a foreground image, based on the information supplied from the counting unit 56, and supplies the separated foreground image to the foreground image updating unit 55.

In step S75, the foreground image updating unit 55 stores (retains) the foreground image supplied from the separating unit 54 on a frame basis and updates the foreground image whenever the foreground image is supplied from the separating unit 54.

In step S76, the foreground image updating unit 55 outputs the updated foreground image to the external display or the like which is not illustrated in the drawing. Moreover, the background model updating unit 51 outputs the lastly updated background image to the external display or the like which is not illustrated in the drawing at the same timing as the outputting of the foreground image. After that, the processing returns to step S72, and the processing of from step S72 to S76 is repeated.

On the other hand, when it is determined that the count value i is larger than the given threshold Ti in step S73, the counting unit 56 supplies the information on the effect that the count value i exceeds the given threshold Ti to the background model updating unit 51, and the processing proceeds to step S77.

In step S77, the counting unit 56 initializes the internally retained count value i to zero (0).

In step S78, the background model updating unit 51 updates the background image retained in the background image retaining unit 53, for example, by performing the background model updating processing using GMM, based on the information supplied from the counting unit 56, and based on the input image, and the background image retained in the background image retaining unit 53. The background model updating unit 51 supplies information on the effect that the background image has been updated to the separating unit 54. The processing proceeds to step S74 after step S78.

In step S74 following step S78, the separating unit 54 separates the input image into a background image to be read from the background image retaining unit 53 and a foreground image based on the information supplied from the background model updating unit 51, and supplies the separated foreground image to the foreground image updating unit 55. Subsequently, the above-described processing is repeated.

According to the above-described processing, the background model updating processing may be performed only when the number of frames of the input image exceeds a given threshold, that is, for every predetermined number of frames. As a result, it becomes possible to extract a person from an input image with relatively small loads compared with a conventional technique which performs the background model updating processing for every frame because separation into the background image and the foreground image is performed without performing the background model updating processing during a period in which the number of frames of the input image does not exceed the given threshold.

Moreover, although the above description is about a case where, in the initial processing performed in the initial mode of the image processing apparatus 11, the initial mask area is set by estimating the person area based on the positional information of the face, an area set by the user's operation which is performed with respect to the input unit 36 may be set as the initial mask area.

[Regarding Example of Initial Processing of Image Processing Apparatus]

Figure 8:
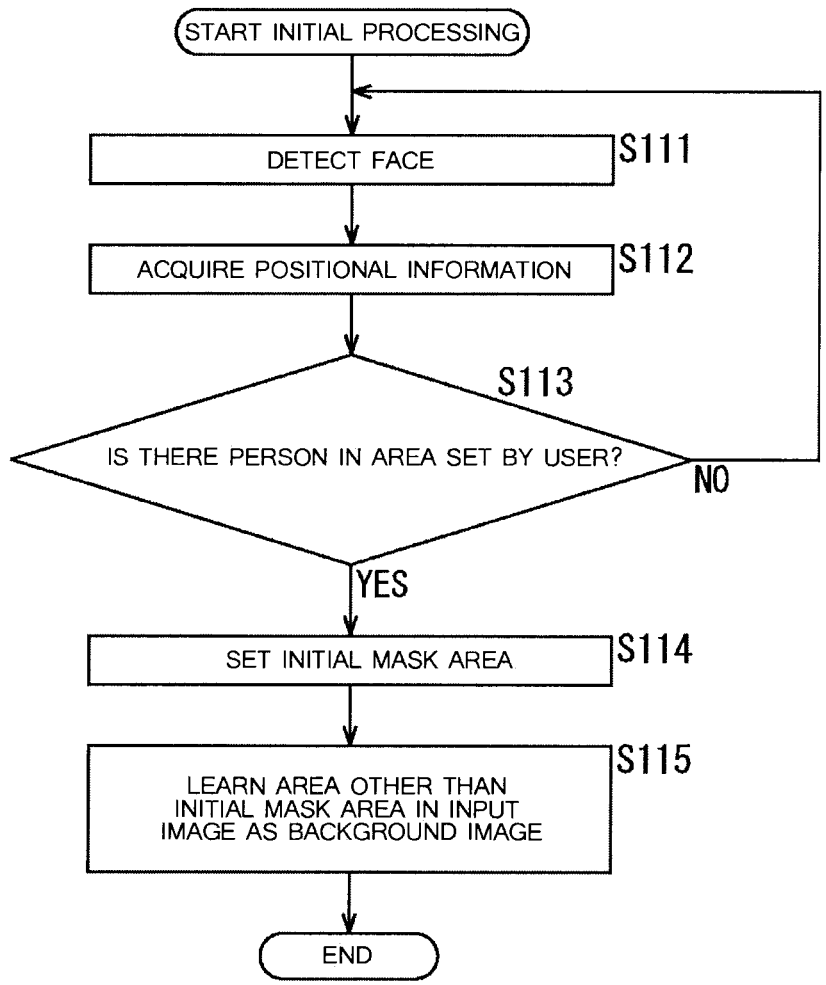
FIG. 8 is a flowchart that describes another example of the initial processing in the initial mode.

Next, referring to a flowchart of FIG. 8, initial processing performed in the initial mode of the image processing apparatus 11 is described in which an area set by the user is set as an initial mask area.

Since processing of step S111, step S112, and step S115 of the flowchart of FIG. 8 is similar to the processing of step S11, step S12, and step S14 of the flowchart of FIG. 3, the description thereof is not repeated.

That is, in step S113, the mask area setting unit 33 determines whether there is a person in an area set by the user within the first frame of the input image, based on information that represents the area set by the user which is input through the input unit 36, and positional information supplied from the positional information acquiring unit 32.

Specifically, the mask area setting unit 33 determines whether a person area estimated by the person area estimating unit 33a substantially agrees with the area set by the user.

When it is determined that there is no person in the area set by the user in step S113, the processing of from step S111 to step S113 is repeatedly performed until the area set by the user and the estimated person area agree with each other.

On the other hand, when it is determined that there is a person in the area set by the user in step S113, the processing proceeds to step S114 so that the mask area setting unit 33 sets the area set by the user as an initial mask area, and supplies information that represents the initial mask area to the background difference calculating unit 34.

According to the above-described processing, the area set by the user can be set as the initial mask area. In particular, until the area set by the user substantially agrees with the estimated person area, the initial mask area is not set. Accordingly, the user can start the extraction processing of extracting a person from the input image having the contents, which the user is aware of beforehand, at desired timing, or enables the extraction processing of extracting a specific person to be performed even when there is a plurality of persons.

Figure 9:
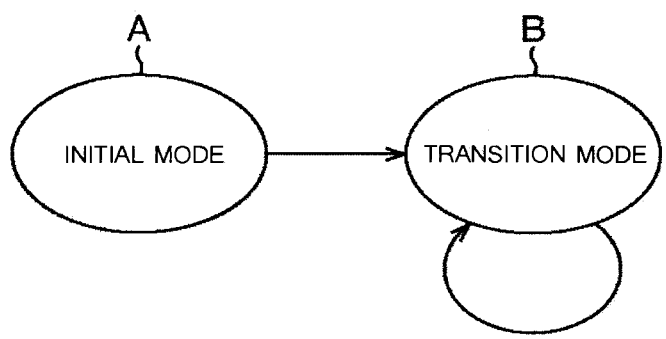
FIG. 9 is a mode shift diagram that illustrates another example of operation modes of an image processing apparatus.

Although the above description has been made in connection with a case where the image processing apparatus 11 has three kinds of operation modes including the initial mode, the transition mode, and the stationary mode, the image processing apparatus may have only two operation modes which are the initial mode and the transition mode as illustrated in the mode shift diagram of FIG. 9.

2. Second Embodiment

[Regarding Example of Operation Mode of Image Processing Apparatus]

The mode shift diagram of FIG. 9 illustrates only two operation modes which are mode A and mode B.

The mode A is an initial mode among the operation modes of the image processing apparatus 11, that is, a mode to perform initial processing on the first frame within extraction processing of extracting a person from an input image. The operation mode shifts from the mode A to the mode B when the image processing apparatus 11 finishes the initial processing.

The mode B is a transition mode among the operation modes of the image processing apparatus 11, that is, a mode to perform transition processing within the extraction processing of extracting a person from an input image. That is, in this mode, the background image is learned from the input image according to the position of the person, on a frame basis, and the background image is repeatedly updated.

In this way, in the image processing apparatus 11 that has the operation modes illustrated in the mode shift diagram of FIG. 9, after the initial mode shifts to the transition mode, the transition mode is repeatedly performed.

Next, although details of the processing in each operation mode of the image processing apparatus 11 having the operation modes described in the mode shift diagram of FIG. 9 will be described, since initial processing performed in the initial mode is similar to the initial processing which has been described referring to the flowchart of FIG. 3 (or, FIG. 8), the description thereof is not repeated.

[Regarding Transition Processing of Image Processing Apparatus]

Figure 10:
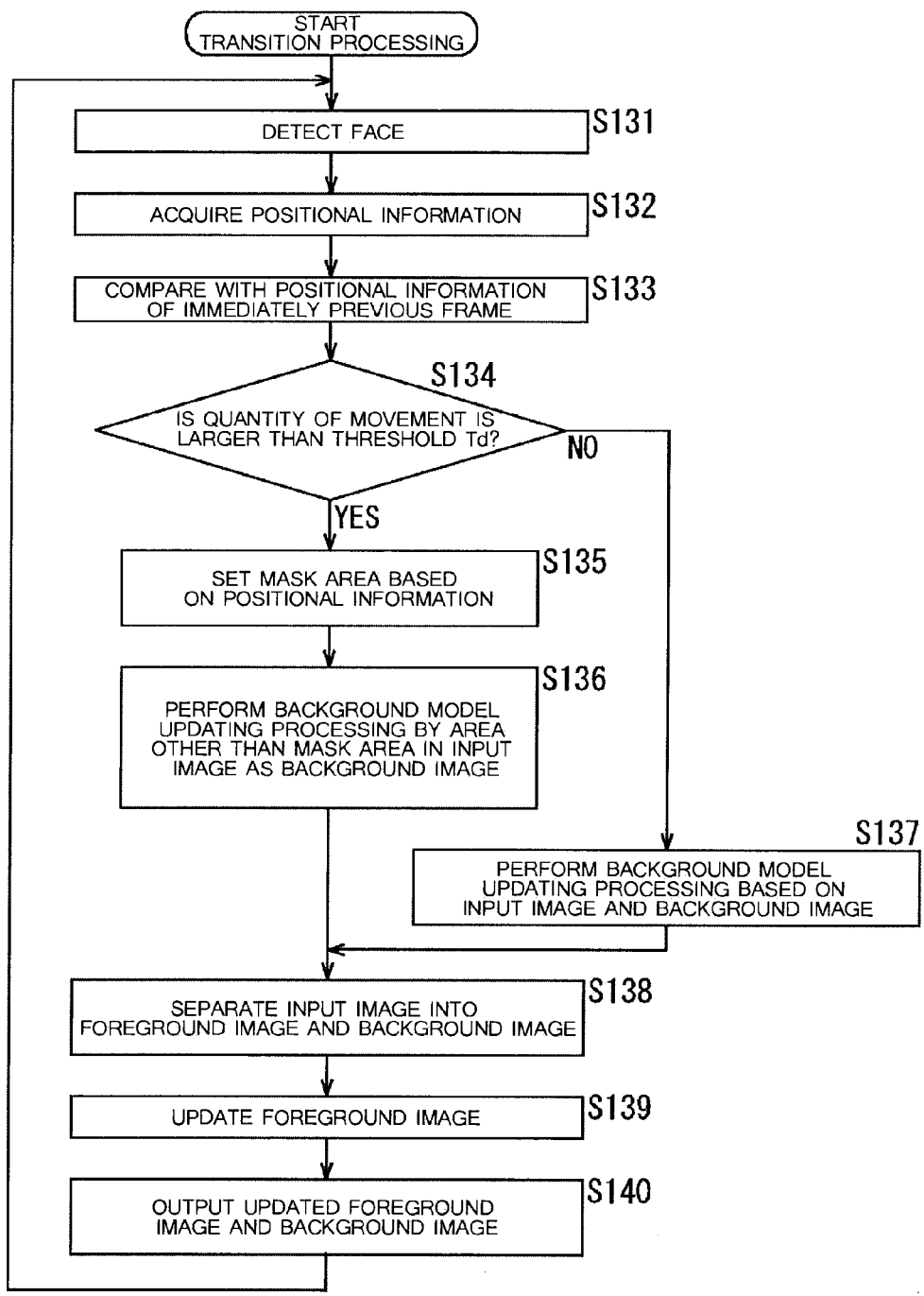
FIG. 10 is a flowchart that describes transition processing in a transition mode among operation modes of FIG. 9.

Next, the transition processing performed in the transition mode of the mode shift diagram described in FIG. 9 is described referring to a flowchart of FIG. 10.

Since processing of from step S131 to step S140 in the flowchart of FIG. 10 is similar to the processing of from step S31 to step S40 in the flowchart of FIG. 6, the description thereof is not repeated.

However, in FIG. 10, the processing returns to step S131 after performing step S140. That is, in the case of the transition processing illustrated in the flowchart of FIG. 10, the processing is repeated regardless of whether there is a remaining initial mask area in the upgraded background image, that is, whether all areas corresponding to the initial mask area are learned as the background image. Therefore, even after all the areas corresponding to the initial mask area are learned as the background image, the background model updating processing is performed according to the change in the position of a person existing in the input image.

According to the above-mentioned processing, when the change in the position of the person in the input image is large, the background model updating processing can be performed after the background image is learned; and when the change in the position of the person in the input image is small, the background model updating processing can be performed based on the background image available at that time. As a result, since the background image can be learned from the input image, preliminary background image learning is not necessary. Therefore, a person can be extracted more simply from the input image. Moreover, since the background model updating processing is performed by using the background image in which the person area after movement of the person is secured even when the quantity of movement of the person area serving as the foreground image is large, it becomes possible to flexibly respond to the background change, and extract the person from the input image more accurately.

The above description has been made in connection with the image processing apparatus which extracts a person as a dynamic body from an input image, but the dynamic body in the input image is not limited to a person. Accordingly, hereinbelow, an image processing apparatus that extracts a dynamic body other than a person from an input image is described.

3. Third Embodiment

[Regarding Another Example of Functional Configuration of Image Processing Apparatus]

Figure 11:
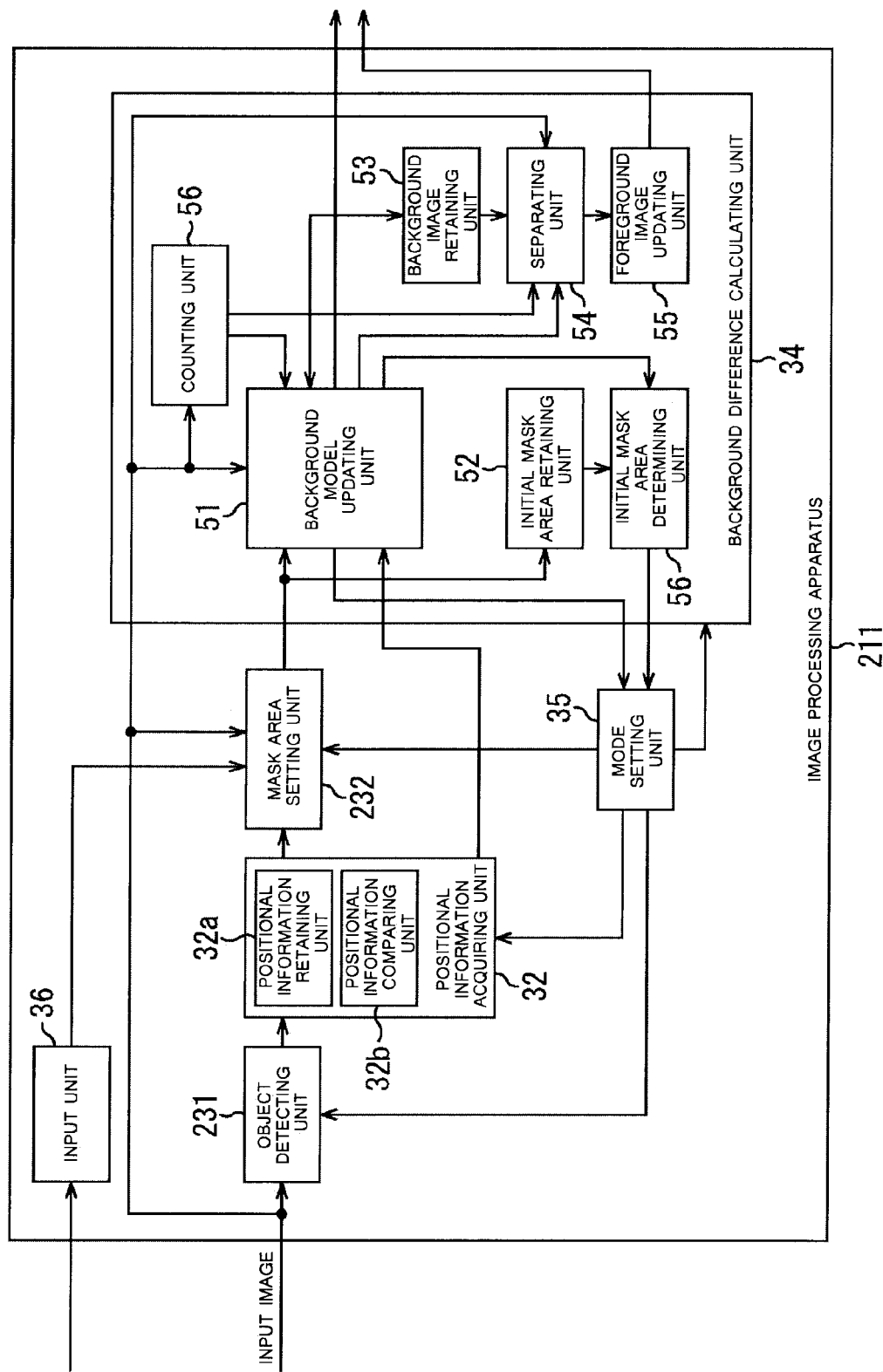
FIG. 11 is a block diagram that illustrates another example of a functional configuration of the image processing apparatus.

FIG. 11 illustrates a functional configuration of another embodiment of an image processing apparatus to which the present invention is applied.

An image processing apparatus 211 of FIG. 11 learns areas other than an area of a dynamic body (an object other than a person) to be observed as a background image on a frame basis in an input moving image and repeatedly distinguishes between a foreground image serving as the area of the dynamic body and a background image, that is, executes background difference-based dynamic body extraction processing.

Among configuration components provided in the image processing apparatus 211 of FIG. 11, configuration components which are the same as the configuration components provided in the image processing apparatus 11 of FIG. 1 are called the same names and denoted by the same reference letters. Accordingly, the description about such configuration components is arbitrarily omitted.

That is, the image processing apparatus 211 of FIG. 11 is different from the image processing apparatus 11 of FIG. 1 in the point that an object detecting unit 231 and a mask area setting unit 232 are provided in place of the face detecting unit 31 and the mask area setting unit 33, respectively.

The object detecting unit 231 detects an object serving as a dynamic body from an input image, and supplies area information that represents an area of the detected object (object area) to a positional information acquiring unit 32. Details of the object detecting unit 231 are described later.

The mask area setting unit 232 sets a mask area which masks the object in the input image based on positional information supplied from the positional information acquiring unit 32, and supplies information that represents the mask area to a background difference calculating unit 34.

Here, the image processing apparatus 211 of FIG. 11 is assumed to operate according to the mode shift diagram described in FIG. 2.

[Regarding Initial Processing of Image Processing Apparatus]

Figure 12:
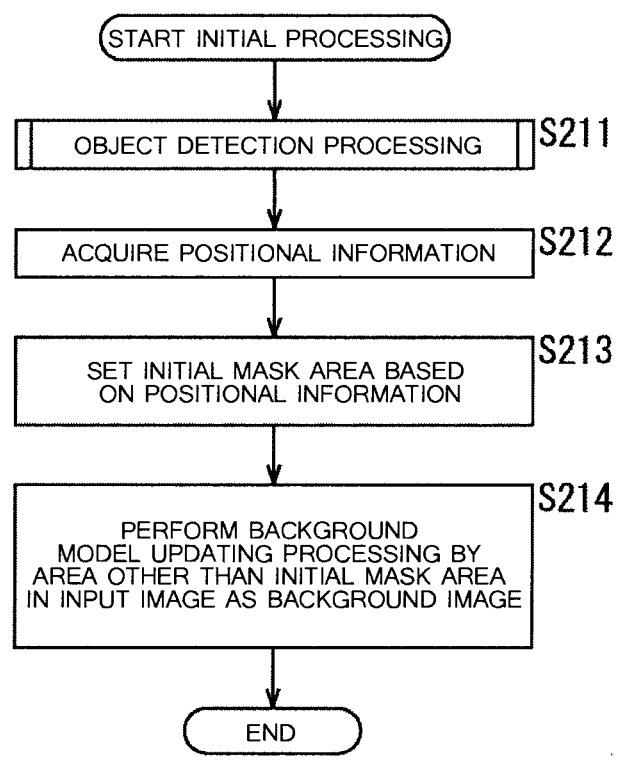
FIG. 12 is a flowchart that describes initial processing in an initial mode of the image processing apparatus of FIG. 11.

First, initial processing performed in an initial mode of the image processing apparatus 211 is described referring to a flowchart of FIG. 12. The image processing apparatus 211 begins the initial processing when the apparatus enters the initial mode, for example, after a power supply is turned on, after input of a moving image ends, or the like, and then a given moving image is input as an input image in such a state.

In step S211, the object detecting unit 231 executes object detection processing to detect an object from a first frame of the input image which is input, and supplies area information that represents an object area detected as a rectangular area to the positional information acquiring unit 32. Details of the object detection processing are described later.

In step S212, the positional information acquiring unit 32 acquires (calculates) positional information that indicates the position of the object detected by the object detecting unit 231, based on the area information supplied from the object detecting unit 231, and supplies it to the mask area setting unit 232. Moreover, the positional information acquiring unit 32 stores the acquired positional information of the object for the first frame in a positional information retaining unit 32a.

In step S213, the mask area setting unit 232 sets an initial mask area that masks the object in the first frame of the input image, based on the positional information supplied from the positional information acquiring unit 32 and supplies information that represents the initial mask area to the background difference calculating unit 34.

In step S214, a background model updating unit 51 learns areas other than the initial mask area in the first frame of the input image as a background image based on the information that represents the initial mask area supplied from the mask area setting unit 232, and causes a background image retaining unit 53 to retain it. At this time, the background model updating unit 51 supplies information on the effect that the initial processing in the initial mode has ended to a mode setting unit 35.

The mode setting unit 35 sets the operation mode of the image processing apparatus 211 to a transition mode based on the information on the effect that the initial processing in the initial mode has ended, which is supplied from the background model updating unit 51, and supplies information that represents the transition mode to all the units which constitute the image processing apparatus 211.

As a result, the image processing apparatus 211 becomes to operate in the transition mode.

[Regarding Transition Processing of Image Processing Apparatus]

Figure 13:
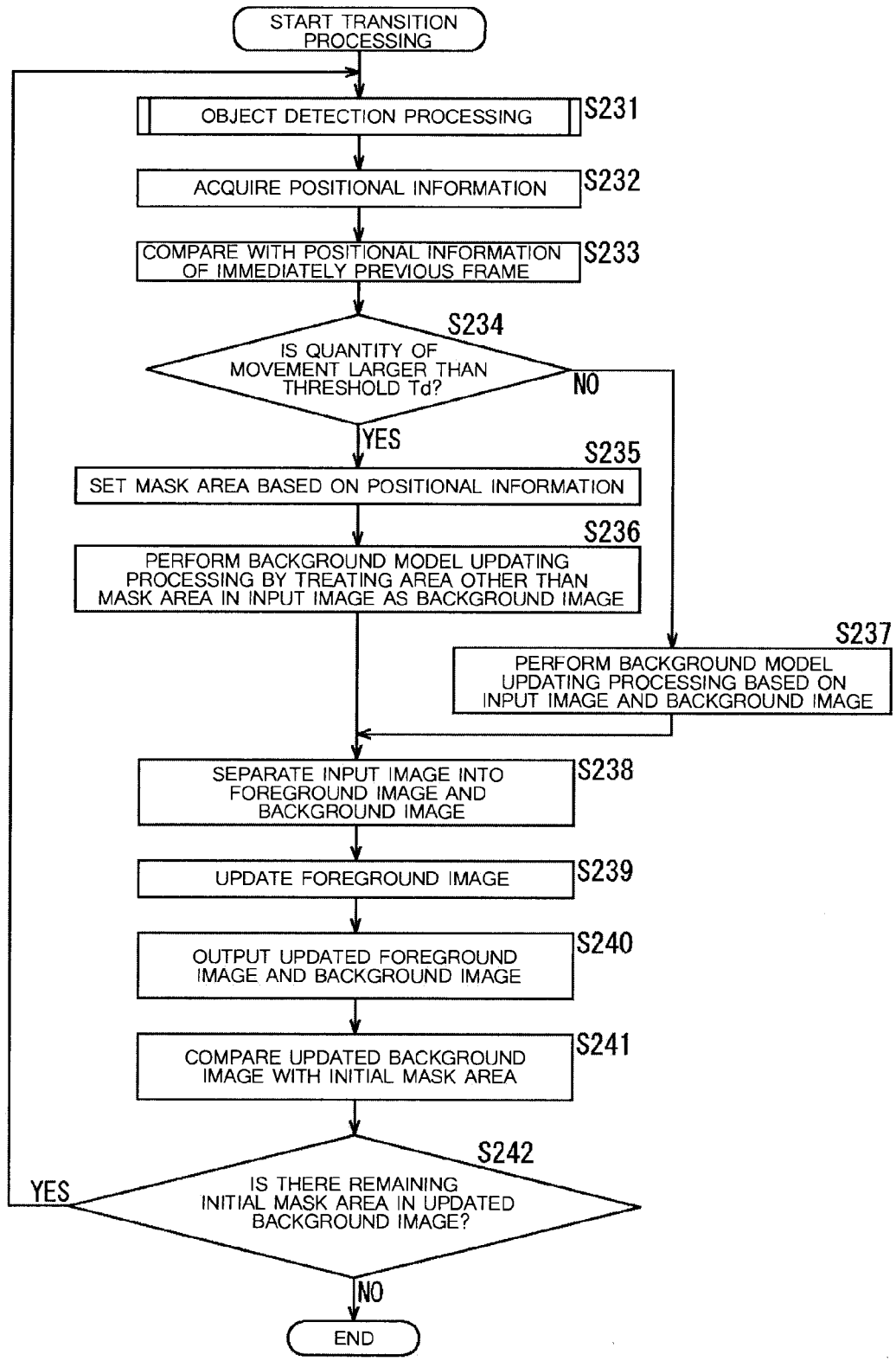
FIG. 13 is a flowchart that describes transition processing in transition mode of the image processing apparatus of FIG. 11.

Continuously, transition processing performed in the transition mode of the image processing apparatus 211 is described referring to a flowchart of FIG. 13.

Since processing of from step S236 to step S242 in the flowchart of FIG. 13 is similar to the processing of from step S36 to step S242 in the flowchart of FIG. 6, the description thereof is not repeated.

In step S231, in a similar manner to the processing of step S211 of FIG. 12, the object detecting unit 231 executes object detection processing to detect the object from the second frame of the input image which is input, and supplies area information that represents an object area detected as a rectangular area to the positional information acquiring unit 32.

In step S232, in a similar manner to the processing of step S212 of FIG. 12, positional information that indicates the position of the object detected by the object detecting unit 231 is acquired (calculated), based on the area information supplied from the object detecting unit 231, and the positional information is supplies to the mask area setting unit 232. Moreover, the positional information acquiring unit 32 stores the calculated positional information of the object in the second frame, in the positional information retaining unit 32*a*.

In step S233, a positional information comparing unit 32*b* of the positional information acquiring unit 32 compares the positional information of an immediately previous frame stored in the positional information retaining unit 32*a*, and the positional information newly acquired in step S232 with each other. Specifically, for example, the positional information comparing unit 32*b* obtains a change in the position of the object between frames by comparing the coordinates of the center of gravity of the object area included in the positional information of the first frame with the center of gravity of the object area included in the positional information of the second frame.

In step S234, the positional information comparing unit 32*b* determines whether the change in the position of the object between the frames which has been calculated in step S232, i.e., the quantity of movement of the object between the first frame and the second frame is larger than a given threshold Td decided beforehand by the user.

When it is determined that the quantity of movement of the object is larger than the given threshold Td in step S234, the positional information acquiring unit 32 supplies the positional information of the second frame acquired in step S232 to the mask area setting unit 33, and the processing proceeds to step S235.

In step S235, in a similar manner to the processing of step S213 of FIG. 12, the mask area setting unit 33 sets the mask area for the second frame of the input image based on the positional information supplied from the positional information acquiring unit 32, and supplies information that represents the mask area to the background difference calculating unit 34.

Subsequently, the processing of step S236 and the subsequent steps are performed in a similar manner to the processing of step S36 and the subsequent steps of the flowchart of FIG. 6, as described above.

[Regarding Example of Functional Configuration of Object Detecting Unit]

Figure 14:
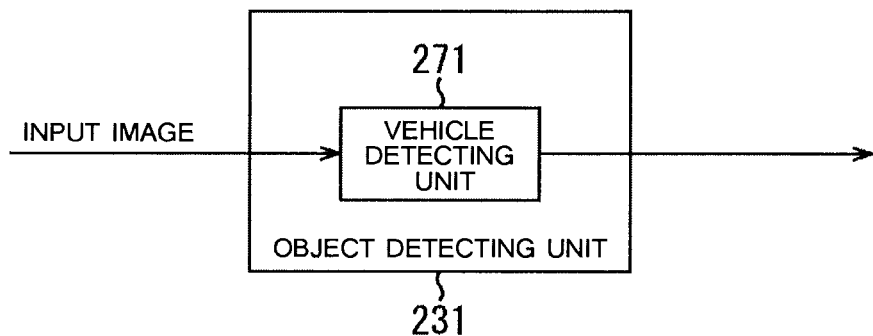
FIG. 14 is a block diagram that illustrates an example of a functional configuration of an object detecting unit.

Here, details of an example of the functional configuration of the object detecting unit 231 of FIG. 11 are described referring to FIG. 14.

The object detecting unit 231 of FIG. 14 includes a vehicle detecting unit 271.

The vehicle detecting unit 271 detects a vehicle (car) from an input image, and supplies area information that represents an area of the detected vehicle to the positional information acquiring unit 32.

[Regarding Object Detection Processing of Object Detecting Unit]

Figure 15:
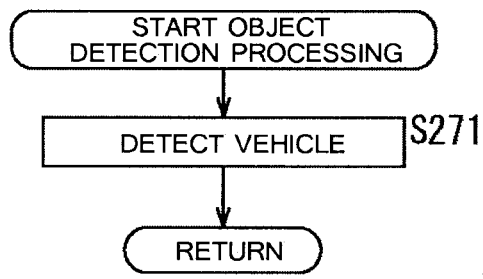
FIG. 15 is a flowchart that describes object detection processing.

Next, the object detection processing in step S211 of FIG. 12 and step S231 of FIG. 13 which is executed by the object detecting unit 231 of FIG. 14 is described referring to a flowchart of FIG. 15.

In step S271, the vehicle detecting unit 271 detects a vehicle from a given frame of the input image which is input. For example, the vehicle detecting unit 271 detects a vehicle from the input image by learning images of vehicles viewed from various directions beforehand, and supplies area information that represents an area of the vehicle, which is detected as a rectangular area, to the positional information acquiring unit 32.

In this way, background model updating processing is performed according to a change in the position of the vehicle in the input image.

According to the above-mentioned processing, when a change in the position of the vehicle in the input image is large, the background model updating processing can be performed after learning the background image; and when the change in the position of the vehicle in the input image is small, the background model updating processing can be performed based on the background image available at that time. As a result, since the background image can be learned from the input image, preliminary background image learning is not necessary. Therefore, the vehicle can be extracted more simply from the input image. Moreover, since the background model updating processing is performed by using the background image in which the vehicle area after movement of the vehicle is secured even when the quantity of movement of the area of the vehicle serving as the foreground image is large, it becomes possible to flexibly respond to the background change, and extract the vehicle from the input image more accurately.

Although the above description has been made in connection with a configuration and processing in a case where the object detected by the object detecting unit 231 is a vehicle, the object detected by the object detecting unit 231 may be an animal.

[Regarding Another Example of Functional Configuration of Object Detecting Unit]

Figure 16:
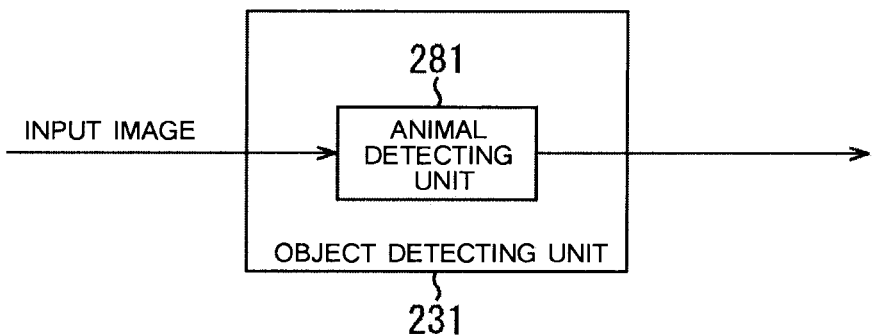
FIG. 16 is a block diagram that illustrates another example of a functional configuration of the object detecting unit.

Here, another example of the functional configuration of the object detecting unit 231 of FIG. 11 is described referring to FIG. 16.

The object detecting unit 231 of FIG. 16 includes an animal detecting unit 281.

The animal detecting unit 281 detects an animal from an input image, and supplies area information that represents the area of the detected animal to a positional information acquiring unit 32.

[Regarding Another Example of Object Detection Processing]

Figure 17:
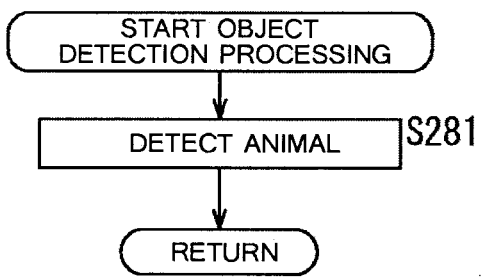
FIG. 17 is a flowchart that describes another example of the object detection processing.

Next, another example of the object detection processing in step S211 of FIG. 12 and in step S231 of FIG. 13 executed by the object detecting unit 231 of FIG. 16 is described referring to a flowchart of FIG. 17.

In step S281, the animal detecting unit 281 detects an animal from the first frame of the input image which is input. For example, the animal detecting unit 281 detects an animal from the input image by learning images of quadrupeds such as dogs, cats, horses, and cows viewed from various directions, and supplies area information that represents the area of the animal which is detected as a rectangular area to the positional information acquiring unit 32.

In this way, background model updating processing is performed according to a change in the position of the animal in the input image.

According to the above-mentioned processing, when the change in the position of the animal in the input image is large, the background model updating processing can be performed after the background image is learned; and when the change in the position of the animal in the input is small, the background model updating processing can be performed based on the background image available at that time. As a result, since the background image can be learned from the input image, preliminary background image learning is not necessary. Therefore, an animal can be extracted more simply from an input image. Moreover, since the background model updating processing is performed by using the background image in which the area of an animal after movement of the animal is secured even when the quantity of movement of the area of the animal serving as the foreground image is large, it becomes possible to flexibly respond to the background change, and extract the animal from the input image more accurately.

So far, the configuration and processing in a case where the object to be detected by the object detecting unit 231 is a vehicle or an animal has been described. However, the present invention is applicable to any cases where the object is a dynamic body detectable in an input image.

Moreover, in the image processing apparatus 211 of FIG. 11, the area set by the user through user's operation with respect to the input unit 36 may be set as the initial mask area like in the image processing apparatus 11 of FIG. 1, or two operation modes which are the initial mode and the transition mode may be provided as illustrated in the mode shift diagram of FIG. 9.

A series of processing mentioned above can be executed with hardware, and can be executed with software. When a series of processing is executed with software, a program which constitutes the software may be installed from a program recording medium into a computer which is incorporated in dedicated hardware, or, for example, a general-purpose personal computer which can execute various functions when various programs are installed therein.

Figure 18:
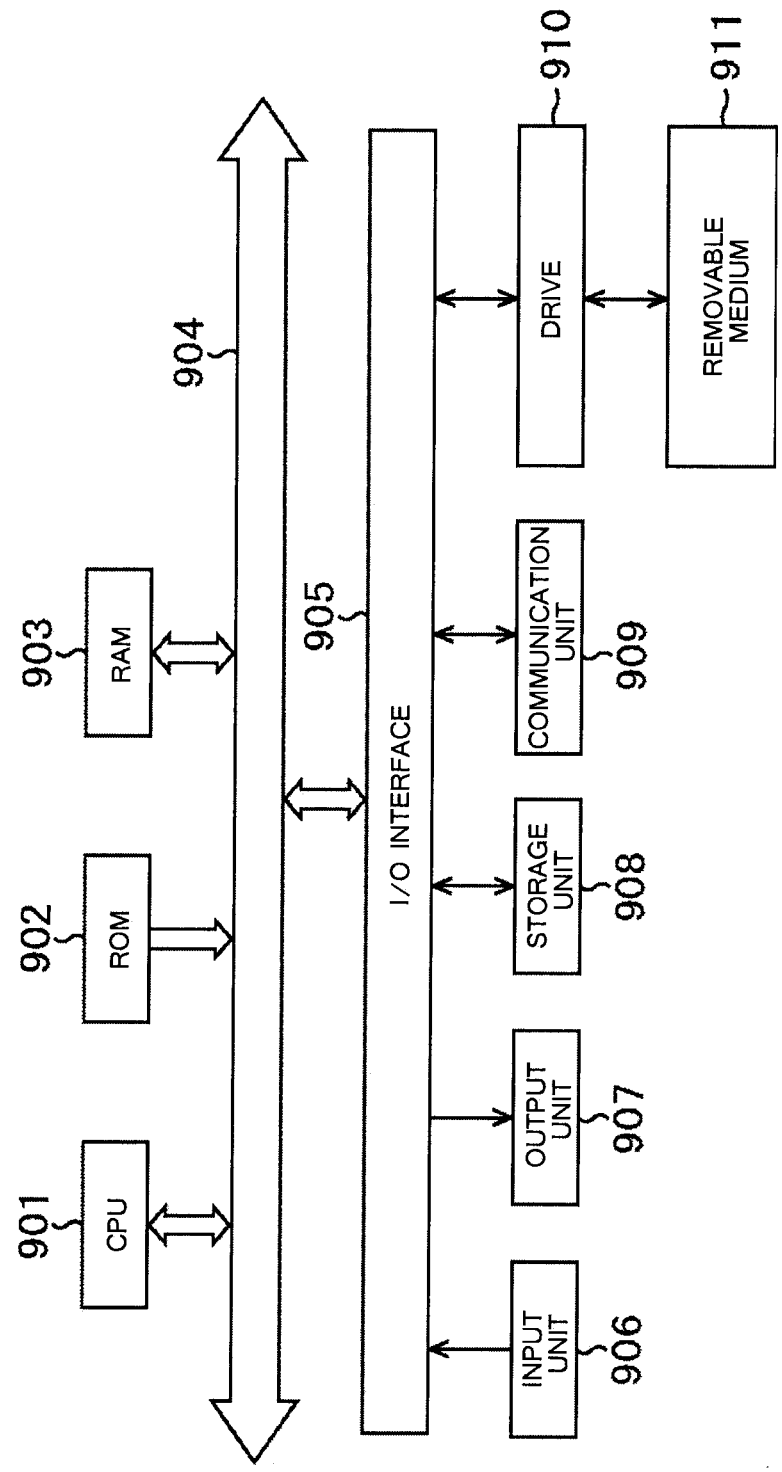
FIG. 18 is a block diagram that illustrates an example of a configuration of hardware of a computer.

FIG. 18 is a block diagram that illustrates a configuration example of hardware of a computer that executes the series of processing mentioned above by using a program.

In the computer, a CPU (Central Processing Unit) 901, a ROM (Read Only Memory) 902, and a RAM (Random Access Memory) 903 are mutually connectable by a bus 904.

In addition, an I/O interface 905 is connected to the bus 904. The I/O interface 905 is further connected to an input unit 906 including a keyboard, a mouse, and a microphone, an output unit 907 including a display, and speaker, a storage unit 908 including a hard disc or a nonvolatile memory, a communication unit 909 including a network interface, and a drive 910 that drives a removable medium 911 such as a magnetic disc, an optical disc, a Magneto Optical disc, and a semiconductor memory.

In the computer having the above-described configuration, the series of processing is performed, for example, in a manner that the CPU 901 loads the program stored in the storage unit 908 into the RAM 903 via the I/O interface 905 and the bus 904 and executing the program.

The program executed by the computer (CPU 901) is provided in the form of storing in, for example, a removable medium 911 that is a magnetic disc (including a flexible disc), an optical disc (CD-ROM (Compact Disc-Read Only Memory), DVD (Digital Versatile Disc), etc.), a Magneto Optical disk, or a package medium composed of semiconductor memories, etc., or is provided through a wired or wireless transmission medium such as a local area network, the Internet, and digital satellite broadcasting.

Moreover, the program may be installed in the storage unit 908 through the I/O interface 905 by mounting the removable medium 911 to the drive 910. Alternatively, the program may be received by the communication unit 909 through the wired or wireless transmission medium and installed into the storage unit 908. Additionally, the program may be installed in the ROM 902 or the storage unit 908 beforehand.

The program executed by the computer may be a program which performs processing in a time series manner along the procedure described in the specification of the present application, or may be a program which performs processing in parallel or at necessary timing for example when there is a call.

That is, embodiments of the present invention are not limited to the embodiments described above, and various changes thereto are possible within the scope of the invention without departing from the gist of the invention.

REFERENCE SIGNS LIST

11 Image processing apparatus
31 Face detecting unit
32 Positional information acquiring unit
32a Positional information retaining unit
32b Positional information comparing unit
33 Mask area setting unit
33a Person area estimating unit
34 Background difference calculating unit
35 Mode setting unit
36 Input unit
51 Background model updating unit
52 Initial mask area retaining unit
53 Background image retaining unit
54 Separating unit
55 Foreground image updating unit
56 Counting unit
57 Initial mask area determining unit
211 Image processing apparatus
231 Object detecting unit
232 Mask area setting unit
271 Vehicle detecting unit
281 Animal detecting unit

The invention claimed is:
1. An image processing apparatus comprising:
a central processing unit (CPU) configured to:
detect a dynamic body from a second frame of an input image;
set an area of the dynamic body in the second frame as a mask area based on a position of the dynamic body in the second frame;

update a background image of a first frame previous to the second frame by learning areas other than the mask area in the second frame as the background image; and separate the second frame of the input image into a background image, and a foreground image that is an area of the dynamic body in the input image, based on the updated background image of the first frame and the second frame of the input image.

2. The image processing apparatus according to claim 1, wherein the CPU is configured to:

detect the dynamic body for each frame of the input image;

the mask area when a change in the position of the dynamic body between the second frame and the first frame is larger than a given threshold; and update the background image of the first frame by learning, as the background image, the area other than the mask area that is set when the change in the position of the dynamic body between the second frame and the first frame is larger than the given threshold.

3. The image processing apparatus according to claim 2, wherein the CPU is configured to:

an area of the dynamic body in the first frame of the input image as an initial mask area; and learn areas other than the mask area that is set when the change in the position of the dynamic body between the second frame and the first frame is larger than the given threshold and when an area corresponding to at least a portion of the initial mask area remains not learned as the background image.

4. The image processing apparatus according to claim 3, wherein the CPU is configured to:

store the updated background image of the first frame; and update the background image based on the second frame of the input image, and the stored background image when the change in the position of the dynamic body between the second frame and the first frame is larger than the given threshold.

5. The image processing apparatus according to claim 4, wherein the CPU is configured to:

update the background image based on the input image, and the stored background image for a predetermined number of frames when all the correspondence areas are learned as the background image.

6. An image processing method comprising:

a device configured to:

detect a dynamic body from a second frame of an input image;

set an area of the dynamic body in the second frame as a mask area based on a position of the dynamic body in the second frame;

update a background image of a first frame previous to the second frame by learning areas other than the mask area in the second frame as the background image; and separate the second frame of the input image into a background image, and a foreground image that is an area of the dynamic body in the input image, based on the updated background image of the first frame and the second frame of the input image.

7. A non-transitory computer-readable recording medium having stored thereon, a set of computer-executable instructions for causing a computer to perform steps comprising:

detecting a dynamic body from a second frame of an input image;

setting an area of the dynamic body in the second frame as a mask area based on a position of the dynamic body in the second frame;

updating a background image of a first frame previous to the second frame by learning areas other than the mask area in the second frame as the background image; and separating the second frame of the input image into a background image, and a foreground image that is an area of the dynamic body in the input image, based on the updated background image of the first frame and the second frame of the input image.

8. The image processing apparatus according to claim 1, wherein the CPU is configured to:

detect a face of the dynamic body from the second frame of the input image.

9. The image processing apparatus according to claim 8, wherein the CPU is further configured to:

estimate the area of the dynamic body based on a face area of the detected face of the dynamic body.

10. The image processing apparatus according to claim 9, wherein the CPU is configured to:

determine a change in the position of the dynamic body between the second frame and the first frame by comparing coordinates of center of gravity of the face area in the second frame and the first frame.

11. The image processing apparatus according to claim 9, wherein the CPU is configured to:

detect the face area as a rectangular area represented by coordinates of a upper-left vertex and lower-right vertex of the rectangular area.

12. The image processing apparatus according to claim 1, wherein the CPU is configured to:

set an area set by a user as an initial mask area when the dynamic body is determined in the area set by the user.

* * * * *